Patented July 26, 1927.

1,636,952

UNITED STATES PATENT OFFICE.

AUGUSTUS E. CRAVER, OF CLIFFSIDE, NEW JERSEY, ASSIGNOR TO THE BARRETT COMPANY, A CORPORATION OF NEW JERSEY.

PROCESS OF PRODUCING ACETALDEHYDE.

No Drawing.　　　Application filed March 13, 1922.　Serial No. 543,493.

This invention relates to improvements in catalysts, particularly to catalysts which are capable of causing oxidation reactions and to processes of oxidation wherein such catalysts are employed. It relates more specifically to the selective oxidation of ethyl alcohol and has particular reference to the production of acetaldehyde by subjecting ethyl alcohol to oxidation by means of oxygen either alone or admixed with other gases in the presence of a catalyst.

I am aware that the vapor phase catalytic oxidation of ethyl alcohol to acetaldehyde has been decribed before, but the following discloure of my invention will make clear the improvements which I have effected in the catalyst and also in the procedure over the previous processes.

The following equations are involved in the vapor phase catalytic oxidation of ethyl alcohol:

(1) $C_2H_5OH + O = CH_3CHO + H_2O$.

(2) $C_2H_5OH + 2O = CH_3COOH + H_2O$.

(3) $C_2H_5OH + 6O = 2CO_2 + 3H_2O$.

(4) $CH_3CHO = CH_4 + CO$.

(5) $C_2H_5OH = C_2H_4 + H_2O$.

It is obvious that equation (1) represents the desired course of the oxidation as all the succeeding equations represent either a loss of ethyl alcohol or acetaldehyde.

Equations (1), (2) and (3) depend to the greatest extent on the inherent properties peculiar to any one catalyst while equations (4) and (5) really depend to greatest extent on the temperature of the catalyst or reaction zone during the oxidation. It is apparent that the temperature of oxidation should be as low as possible as equations (4) and (5) represent pyrogenetic reactions.

In the Journal für pracktische Chemie, year 1907 (N. S.) volume 75, pages 149 to 150, a process is vaguely described in which a mixture of ethyl alcohol vapor and a very small amount of air is passed through a combustion tube containing a layer of asbestos impregnated with vanadium pentoxide which is gently heated at the start of the run. The heat of the reaction of the oxidation of the ethyl alcohol is said to soon cause the catalyst to glow, and continues to do so as long as the ethyl alcohol air mixture is passed over it. No information is given in this article concerning the composition of the air alcohol mixture, the amount of catalyst, the time of contact of the reaction mixture with the catalyst, the temperature of the catalyst, various features of the apparatus, nor are the yields of acetaldehyde or acetic acid or the percentage of unaltered alcohol or the composition of the exit gases given or their extent intimated, but judging by the much more carefully regulated experiments which I have made with vanadium oxide, the aldehyde yield as obtained by this above procedure was undoubtedly quite low, and the yield of acetic acid and the amounts of decomposition and oxidation of the ethyl alcohol beyond the aldehyde state were undoubtedly high owing to the extremely high temperature of the catalyst and reaction zone.

Another process described for the production of acetaldehyde is that of J. E. Orloff, in the Journal of the Russian Chemical Society, volume 40, pages 203–215, year 1908. According to the description, a mixture of 1.8 parts of air and 1.0 part of ethyl alcohol by weight is passed through a glowing freshly reduced copper gauze. A production of 63 pounds of acetaldehyde per 100 pounds of ethyl alcohol passed through the system was obtained with practically all of the remaining alcohol undergoing further oxidation or decomposition into carbon dioxide, water, carbon monoxide, ethylene and a small amount of acetic acid. From the above it is evident that about one-third of the alcohol passed through the catalyst is wasted. Orloff states that side by side with the exothermic reaction of the oxidation of ethyl alcohol to acetaldehyde, there is an endothermic reaction due to the decomposition of the ethyl alcohol into water and ethylene, caused by the extremely high temperature of the reaction zone, the reaction being $$CH_3CH_2OH = CH_2:CH_2 + H_2O.$$

Furthermore, the high catalyst temperature also causes a pyrogenetic decomposition of the acetaldehyde, producing thereby methane and carbon monoxide. That these two disadvantageous side reactions occur in Orloff's process is evidenced by the fact that a very large amount of ethylene, methane and carbon monoxide was found in the exit gases. Experimental evidence also exists showing that these two reactions ensue, as W. Ipatiew in the Berichte der deutschen Chemischen Gesellschaft, volume 34, pages 3579 to 3583 (year 1901), and volume 35, pages 1047 and 1048 (year 1902) has shown that at a temperature of 780–850° C. ethyl alcohol, when passed through a hard glass or porcelain tube, undergoes very extensive decomposition into ethylene, water, carbon monoxide, methane and hydrogen, the methane and carbon monoxide resulting from the pyrogenetic decomposition of a part of the acetaldehyde which is formed to a small degree. Furthermore, W. A. Bone and H. L. Smith have shown in the Journal of the Chemical Society Transactions, volume 87 (year 1905) pages 913 to 916, that acetaldehyde, when subjected to a temperature of 400° C. in a glazed porcelain tube, undergoes very rapid and almost complete decomposition into equal quantities of methane and carbon monoxide, while at 600° C. the decomposition is more severe, there being formed some carbon and hydrogen in addition to the methane and carbon monoxide.

In both of the above mentioned processes, the catalyst must be maintained at a glowing temperature, which is accomplished solely by regulating the speed of the air alcohol mixture through the catalyst so that the heat of reaction is sufficient to maintain the glowing condition of the catalyst. It is obvious that such a process has several disadvantages; first, the catalyst must be maintained at the glowing temperature in order to secure an appreciable conversion; second, the time of contact of the vapors and catalyst must be extremely short in order to reduce the complete combustion of the ethyl alcohol and the pyrogenetic decomposition of the ethyl alcohol and acetaldehyde. This compensating of running conditions makes the control of the process very difficult. Various parts of the catalyst must, of necessity, differ quite widely in temperature in a process controlled in such a manner.

By my process, however, which is distinctly different, fundamentally, from the processes referred to above, I have been able to effect a considerable improvement in the yield of acetaldehyde. My process is one of pure catalytic oxidation while Orloff's process, as he and other investigators describe it, is primarily one of dehydrogenation, involving the reaction $$C_2H_5OH = CH_3CHO + H_2,$$

the presence of the very slight amount of oxygen in the form of air serving primarily to keep the catalyst in an active condition.

I practice my invention by passing a mixture of air and alcohol in the proportion of about 14 parts of air to 1.0 part of ethyl alcohol by weight through a catalyst consisting of crushed pumice impregnated with vanadium oxide maintained at a temperature of about 300° C. as determined by inserting a thermocouple directly into the catalyst mass. The catalyst mass can be held at a temperature of 300° C. by disposing it in thin layers so that the heat of reaction can be rapidly removed as formed. For example, the catalyst may be contained in metallic tubes of small cross section immersed in a temperature controlling bath. Other means of satisfying the above necessary conditions of this particular example will be apparent to those versed in the art of temperature control. At a speed equivalent to a time of contact of the air alcohol mixture with the catalyst of 0.39 second, I have been able to obtain a production of 70 parts of acetaldehyde per 100 parts of ethyl alcohol charged through the system with a simultaneous production of 10 parts of acetic acid per 100 parts of ethyl alcohol charged, with a complete combustion of the ethyl alcohol of only 3.0% of the amount charged. No carbon monoxide, hydrogen or hydrocarbons could be detected in the exit gases. This production of acetaldehyde corresponds to a theoretical yield of 85%, based on the alcohol undergoing oxidation. The remaining ethyl alcohol passes through unchanged and is recoverable. By time of contact is meant the length of time a molecule of the gas mixture is permitted to remain in contact with the catalytic zone.

Thus by a radical modification of the previously described processes, I have been able to obtain a much higher theoretical yield of acetaldehyde with no detectable pyrolytic decomposition of the ethyl alcohol or the formed acetaldehyde and with a very small percentage of the alcohol undergoing complete combustion to carbon dioxide and water. Furthermore, the catalyst temperature is easily controlled, as the amount of heat liberated during the oxidation is extremely small, since there is no decomposition of the alcohol other than that going into acetaldehyde and the small amount of acetic acid. The enormous increase in the exotherm of the reaction, when the oxidation proceeds beyond the aldehyde stage, is easily understood from the following calculations—For every pound of ethyl alcohol undergoing conversion into acetaldehyde, 2299 British thermal units are liberated, while for every pound oxidized to acetic acid 4500 British thermal units are evolved, and for every pound undergoing complete combustion 13,300 British thermal units; thus the advantage of keeping the complete combustion at a minimum is evident.

If such a large excess of air which I have found so efficacious under the conditions which I employ, were used in the previously described glowing catalyst processes, substantially all the alcohol would undergo combustion to carbon dioxide and water. However, at the low catalyst temperature which I use, this excess of air is very beneficial, as I am able to secure a very high theoretical yield of aldehyde and a negligible loss of alcohol in the form of complete combustion.

I have tried other oxides including those of uranium, copper, chromium, manganese, cobalt, nickel, tin, thorium, zirconium, titanium, cerium, bismuth, molybdenum, tungsten, tantalum and others, in a manner exactly similar to that described above for vanadium oxide except that some temperature variations were employed in order to obtain the optimum production of acetaldehyde with each catalyst. Of these oxides investigated, I have found that cobalt oxide, tin oxide, cerium oxide and titanium oxide gave only traces of acetaldehyde, while the remaining oxides gave fair acetaldehyde productions which, however, were relatively small when compared with that resulting from vanadium oxide, and of these latter oxides chromium oxide, manganese oxide, uranium oxide and copper oxide gave, in addition to the aldehyde production, relatively high complete combustions of the ethyl alcohol.

I have found, however, that when mixtures are made of some of these various oxides, which I have enumerated above, and are used as catalysts in the oxidation of ethyl alcohol to acetaldehyde, even higher yields of the latter are obtained than was possible with vanadium oxide, and in addition, other decided advantages are obtained with these mixed catalysts.

I have investigated a number of these mixed oxide catalysts containing the oxides of at least two metals and have found that the metallic oxide components in such mixed catalysts exert a profound and unexpected influence on each other.

For example, I have found that small amounts of molybdenum oxide, when added to uranium oxide, give a catalyst which produces only acetaldehyde, there being practically no complete combustion and only a very small amount of acetic acid. In this mixture it appears as though the molybdenum oxide, which is fairly inert toward ethyl alcohol, except at high temperatures at which high complete combustion is obtained, functions in a way to depress the activity of the uranium oxide, the normal activity of which tends to exert itself largely beyond the acetaldehyde stage to products of the complete combustion of alcohol.

An investigation of the relative amounts of uranium and molybdenum oxide indicates that the most satisfactory proportion is a mixture containing approximately 93% uranium oxide and 7% molybdenum oxide.

Among tantalum oxide-uranium oxide mixtures a very satisfactory mixture is one containing about 30% of tantalum oxide. Likewise, an investigation of vanadium oxide-molybdenum oxide mixtures showed that a mixture containing 5% of molybdenum oxide was more satisfactory than a straight vanadium oxide catalyst.

I have also investigated numbers of ternary mixtures and have found that of the uranium oxide, copper oxide molybdenum oxide mixtures, a mixture of approximately 87% uranium oxide, 5% of copper oxide and 8% of molybdenum oxide gave a very high aldehyde production with practically no accompanying acetic acid production or complete combustion. The proportions of oxides in another ternary mixture which I have found to be quite successful, as far as the acetaldehyde production is concerned, consists of 85% uranium oxide, 6% vanadium oxide and 9% molybdenum oxide, but with this mixture a small complete combustion of alcohol was observed with a very small acetic acid production.

Although several mixed catalysts have thus been described, it is the intention not to be limited to the proportions in these specific examples, as many other mixtures containing two or more oxides can be prepared. In choosing these oxides to constitute the mixed catalysts, it is essential, however, that they all should catalyze the oxidation of ethyl alcohol to acetaldehyde, as for example, those oxides which I have previously mentioned as giving small acetaldehyde productions when used alone.

In the preparation of these mixed catalysts it is preferable that the component metallic oxides should be in the most minutely divided state possible and in intimate contact with each other in order to secure the maximum benefit of the mixed catalyst.

The production of these mixed catalysts can be accomplished by starting with a solution containing the salts of the metals, the oxides of which metals are desired in the finished catalysts and which metallic salts, on ignition, leave only the oxides of the metals, or it is also possible to use a water suspension of the oxides or hydroxides of the metals. However, I have achieved the greatest success by employing a solution of the complex organic acid compounds of the metals, as described in my co-pending application, Serial No. 513,111. The carrier, which may consist of crushed pumice or other suitable powdered, granulated or fibrous material, which is chemically inactive and acts merely as a mechanical distributor, may then be added to the prepared solution or water suspension of the metallic compounds and the whole evaporated to dryness while being stirred, after which it is ignited in air or other gas or in the presence of the gas mixture containing ethyl alcohol and oxygen to be employed in the catalysis.

My invention will be further explained in connection with the following example which is given for illustrative purposes. It is intended not to limit the procedure to the exact details given, as the process can be varied over wide limits both in the choice of the conditions and also in the composition of the catalyst, without departing from the spirit and scope of the invention.

A mixture of approximately 14 parts of air to 1.0 part of ethyl alcohol by weight is passed through a catalyst consisting of crushed pumice impregnated with a mixture of 93% of uranium oxide and 7% molybdenum oxide held at a temperature of about 375° C., measured by inserting a thermocouple directly into the catalyst mass and maintaining a time of contact of the air-alcohol mixture with the catalyst of 0.38 second. The catalyst mass may be maintained at the desired temperature, as described above. The products of the reaction, together with the small amounts of unchanged alcohol, may then be condensed or passed through scrubbers or collected in some other manner, the acetaldehyde recovered, and the unaltered alcohol regained and used over again.

A production of 57 pounds of acetaldehyde per 100 pounds of ethyl alcohol charged through the system was obtained along with a simultaneous acetic acid production of 3.0 pounds per 100 pounds of alcohol charged and with no complete combustion. This yield of acetaldehyde corresponds to a theoretical yield of 93%, i. e. based on the alcohol undergoing oxidation, and leaves about 40% of the charged alcohol which passed through unchanged to be subsequently recovered.

It will be evident that the various conditions of the reaction as stated above are capable of wide variation. Among these conditions may be mentioned the pressure at which the oxidation is carried out, as for example, the reaction may be conducted at atmospheric pressure or at increased or diminished pressure; the time of contact of the reaction gases with the catalyst; the proportion of catalyst to the reaction gases; the relative proportions of ethyl alcohol to oxygen-containing gas, which may consist of air, oxygen, or ozone, or a mixture of any or all of these or other gases which contain free oxygen. These conditions are all more or less dependent on each other. Furthermore, much variation exists in the choice of the mixed catalyst, which in turn will necessitate variation or adjustment of the other conditions enumerated above in order to utilize to the greatest advantage the improvement in the composition of the catalyst. Considerable variation also exists in the temperature of the catalyst mass, which temperature will be influenced by variations in the conditions previously mentioned, but in all cases the temperature must be maintained below the point at which pyrolytic decomposition of the ethyl alcohol or the generated acetaldehyde ensues. I have found that the catalyst temperature should not exceed 500° C.

Thus, by means of processes differing radically from the previously described processes for obtaining acetaldehyde from ethyl alcohol, which processes include a relatively low reaction temperature, a great excess of oxygen over the theoretical requirement, and a different type of catalyst, I have been able to obtain greatly augmented productions of acetaldehyde with very small acetic acid productions and practically no complete combustion of the ethyl alcohol when compared with previously described processes. In theoretical yields I have been able to approach close to 100%. Furthermore, my oxidation process is always conducted at such a low temperature (below 500° C. catalyst temperature) that no detectable pyrolytic decomposition of ethyl alcohol or acetaldehyde has been observed. The absence of complete combustion of the ethyl alcohol and the very small acetic acid production causes such a small exotherm that the catalyst temperature can be easily and accurately controlled, which condition is so essential to the success of a catalytic oxidation process. Another advantage of my process is that relatively impure alcohol can be employed with satisfactory results.

I claim:—

1. The process of producing acetaldehyde, which comprises passing ethyl alcohol in the vapor phase and an oxygen-containing gas into contact with vanadium oxide at a temperature of about 300° C.

2. The process of producing acetaldehyde, which comprises passing ethyl alcohol in the vapor phase and an oxygen-containing gas into contact with vanadium oxide at a temperature of about 300° C. for approximately 0.4 of a second.

3. The process of producing acetaldehyde, which comprises passing ethyl alcohol in the vapor phase and an oxygen-containing gas into contact with a catalyst comprising oxides of two metals of the fifth and sixth periodic groups for about 0.4 of a second at a temperature below 500° C.

4. The process of producing acetaldehyde, which comprises passing ethyl alcohol in the vapor phase and an oxygen-containing gas into contact with a catalyst comprising oxides of vanadium and molybdenum, 5. The process of producing acetaldehyde which comprises passing ethyl alcohol in the vapor phase and air in approximately the proportions of 1 to 14 into contact with vanadium oxide at a temperature of about 300° C.

6. The process of producing acetaldehyde which comprises passing ethyl alcohol in the vapor phase and an oxygen containing gas into contact with vanadium oxide at a temperature below 500° C.

In testimony whereof I affix my signature.

AUGUSTUS E. CRAVER.